United States Patent Office 3,442,066
Patented May 6, 1969

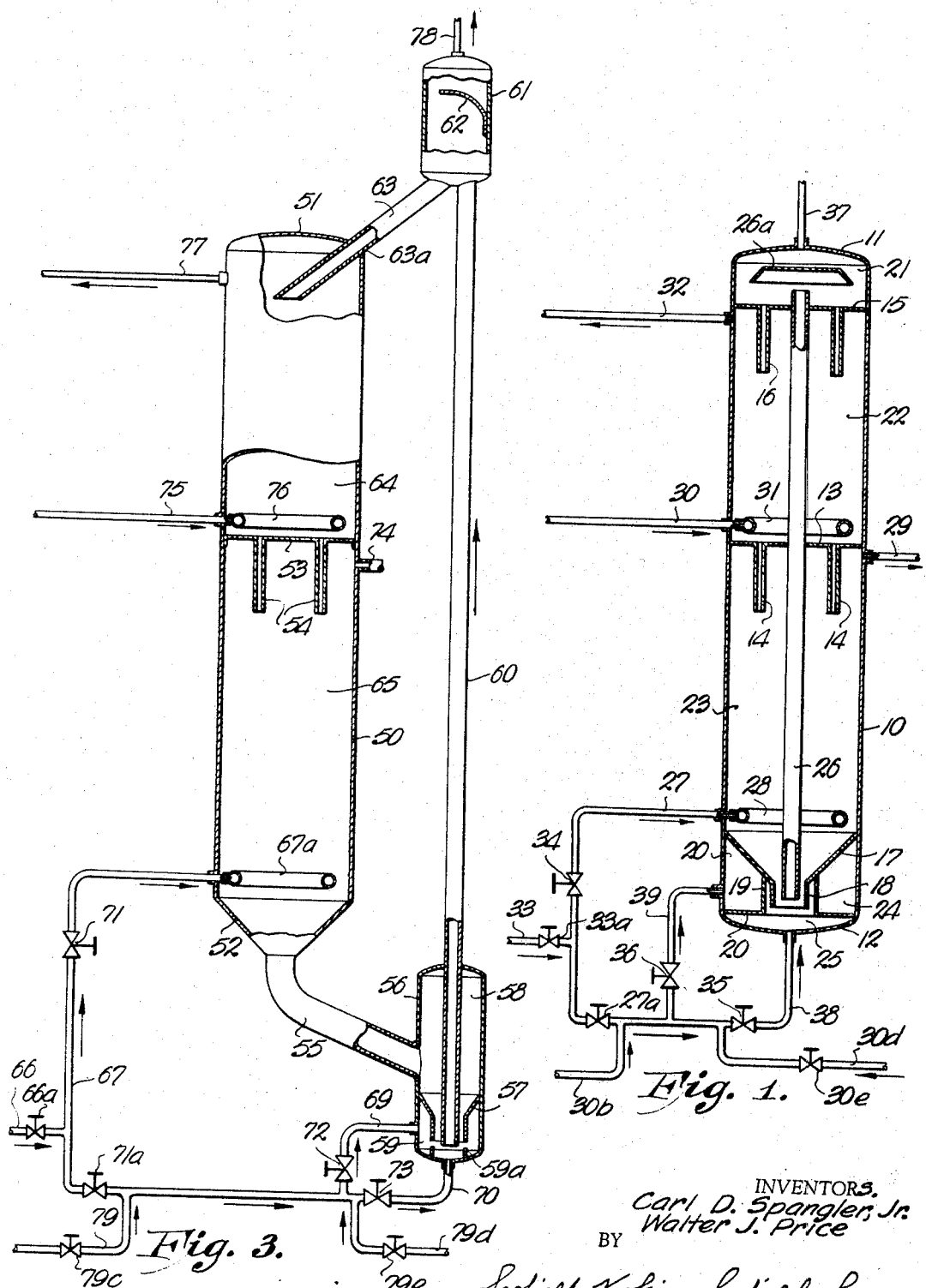

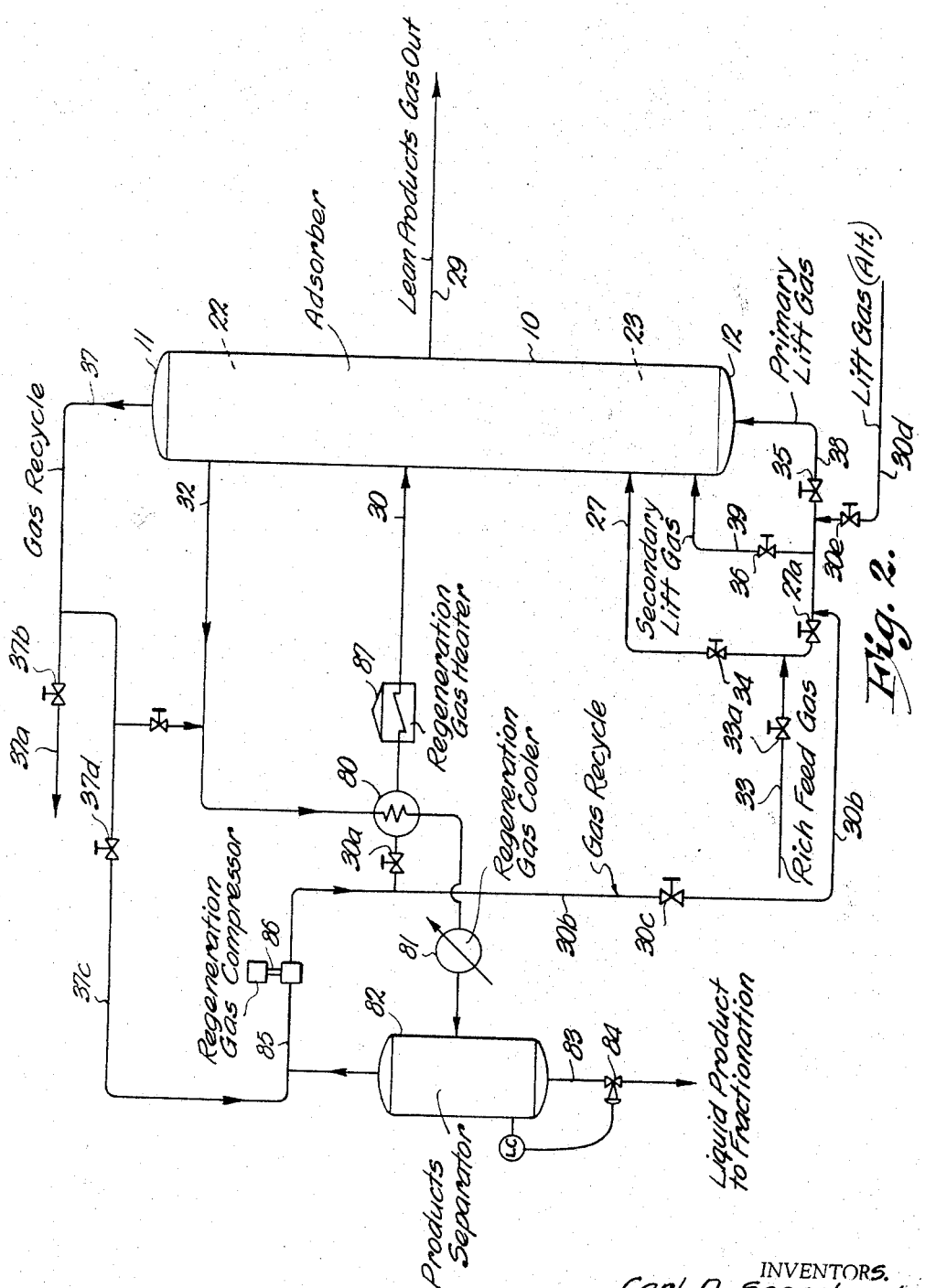

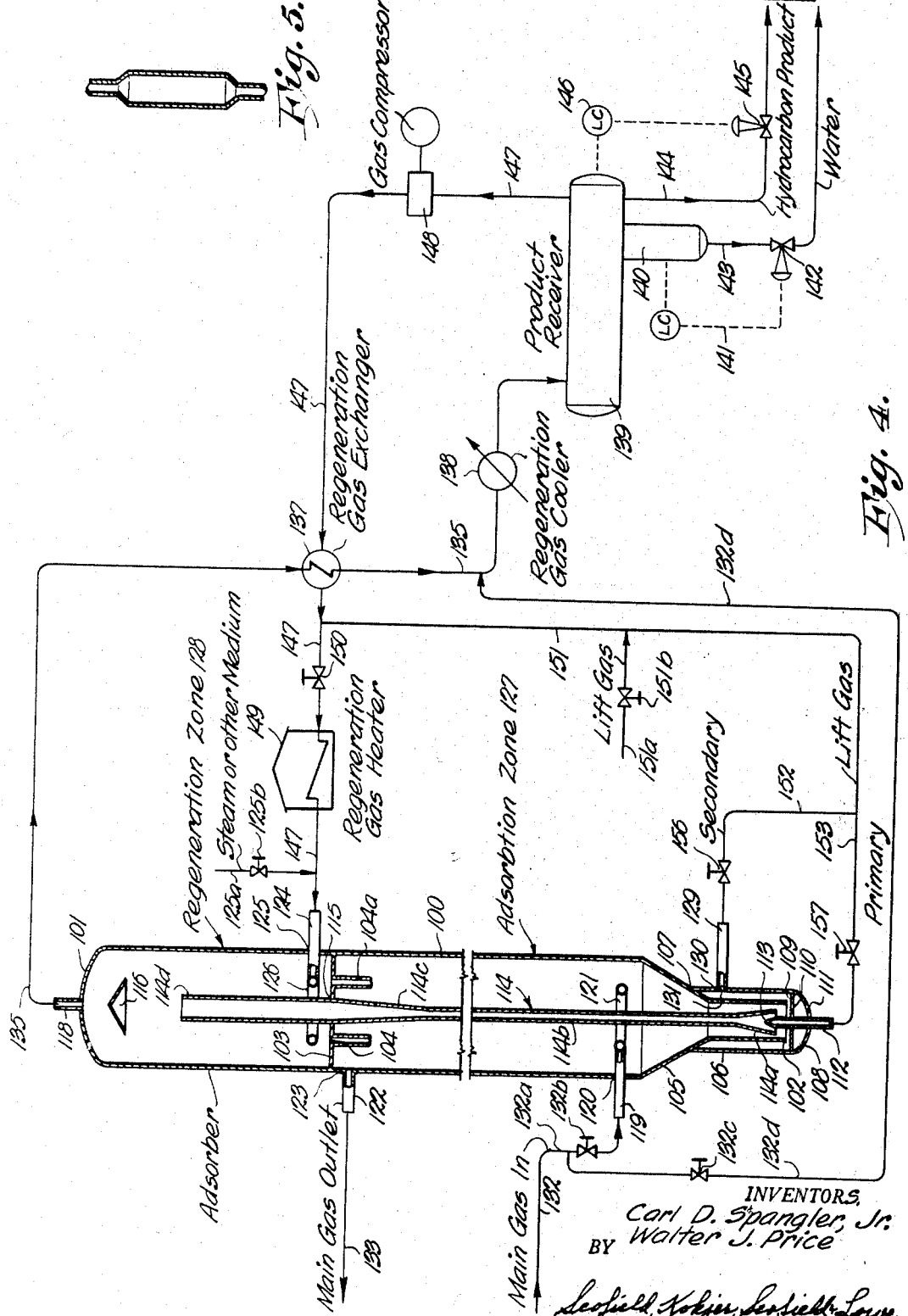

3,442,066
MOVING BED ADSORPTION APPARATUS
Carl D. Spangler, Jr., Ponca City, Okla., and Walter J. Price, Houston, Tex., assignors to The C. W. Nofsinger Company, a corporation of Missouri
Continuation of application Ser. No. 489,802, Sept. 14, 1965, which is a continuation of application Ser. No. 228,580, Oct. 5, 1962. This application Aug. 12, 1966, Ser. No. 572,152
Int. Cl. B01d 53/08
U.S. Cl. 55—390       1 Claim

ABSTRACT OF THE DISCLOSURE

An operable continuous moving bed apparatus for selectively extracting gaseous fluids employing adsorption and regeneration zones in a single vessel and gas lift for recycling the adsorbent requires: (a) maintenance of a pressure balance in the system to assure control of the relative rates of flow of the adsorbent in the gas lift, regeneration and adsorption sections, which pressure balance is obtained by the amounts of lift gas introduced to said gas lift, and adsorption section, and (b) the passage of a small amount of gas upwardly from the adsorption section into the regeneration section which prevents back flow of gas in the opposite direction, arching of the adsorbent and a uniform gravitational flow of the adsorbent in both sections.

---

This application is a continuation of Ser. No. 489,802, filed Sept. 14, 1965 and now abandoned, which is a continuation of Ser. No. 228,580, filed Oct. 5, 1962 and now abandoned.

This invention relates to methods of and apparatus for moving bed adsorption in the contacting of gases and solids and refers more particularly to a continuous, moving bed adsorption process and apparatus therefor employing a solid particulate material, the said solid particulate adsorbent material continuously regenerated for return to the adsorption zone.

In the use of solid adsorption materials for contacting of gases therewith, it has previously been necessary to carry out such contact in either (1) fixed beds with cyclic recovery of the adsorbed material from the bed or (2) an apparatus wherein the bed of solid adsorbent is continuously moved through successive adsorption and reactivation phases. There are many known applications of adsorption processes all primarily concerned with the separation of vapors and specific gaseous components from a gas phase. Another interesting, although not widely used, application involves the use of a solid adsorbent to provide a reactive surface for a chemical reaction. The adsorbent in the latter case can provide not only a surface on which the reaction can take place, but may also act as a catalyst which my or may not require reactivation at regular intervals.

Nearly all of the currently employed adsorption processes utilize an adsorbent which is either discarded after it is spent or is reactivated in place and reused in a cyclic procedure.

Fixed bed adsorption applications

Fixed bed adsorbers are most frequently used to adsorb water and solvent vapors from various gases and liquids. The natural gas industry uses a large number of such units to provide the low water dew point required for interstate pipe line transmission of natural gas. These latter units require at least two adsorber vessels which cycle on a preset timer such that one vessel is adsorbing water vapor while the other is being regenerated by stripping with heated gas. The stripping gas is cooled and water which is removed from the bed is condensed and eliminated from the system.

Other fixed bed adsorption units are widely used to adsorb color and odor bearing materials and other impurities from gases and liquids. These units are not always regenerative, in which case the adsorbent is merely discarded when it becomes spent. Many other special applications of adsorption processes are described in various books and technical journals.

One large new field of adsorption is receiving considerable interest at the present time which involves the use of special adsorbents such as the so-called "molecular sieve." Such adsorbents owe their performance to the very regular size of the openings (pores) in the particular adsorbent material. This regular pore size permits compounds of a certain molecular size to enter the pores in the adsorbent and be retained while the other components in the process stream pass on through the adsorbent bed.

Earlier moving and fluidized bed adsorbers

Since cyclic operation of an adsorption process necessarily involves two or more adsorption beds and other undesirable characteristics, there has been considerable interest in moving bed adsorbers for certain applications. Several obvious advantages are inherent in a continuous moving bed adsorber, one of the most important of which is that all of the adsorbent is effectively "loaded" to its optimum adsorbing capacity before it is reactivated. Another important feature is that the yield of adsorbate is of consistent quality and is produced at a constant rather than a varying rate as with a cyclic fixed bed operation.

It has always been recognized that the cyclic operation required in fixed bed adsorption applications is both expensive and undesirable due to the inherent composition changes of the process streams. In an effort to eliminate these objectionable features, various designs of moving bed and fluidized adsorbers have been proposed. Some have been actually installed, but their success has been limited due to various mechanical and process difficulties.

Objects

The instant application proposes a new design of moving bed adsorber and process employed in conjunction therewith.

An object of the invention is to provide a gravity flow moving bed adsorber usable in situations wherein it is desirable to adsorb one or more components from a gaseous stream onto and/or into a solid with recovery of the adsorbed material from the solid by heating and/or stripping the adsorbent.

Another object of the invention is to provide a gravity flow moving bed adsorbing unit which represents and requires a minimum installation cost for several reasons: (a) all of the equipment is effectively utilized at all times, rather than operating on a cycle, (b) inventory of adsorbent is a minimum and (c) adsorbent is loaded on the optimum extent of each pass between regenerations.

Another object of the invention is to provide a gravity flow moving bed adsorber unit which has considerably less pressure drop than a fixed bed unit since no switching valves are required on the process gas stream.

Another object of the invention is to provide a gravity flow moving bed adsorber unit which has a minimum operating cost due to reduced fuel requirements, as it is not necessary to continually heat and cool some part of the unit.

Another object of the invention is to provide a gravity flow moving bed adsorbing unit which is able to achieve a higher recovery since the freshly regenerated adsorbent always contacts the leanest gas in a truly countercurrent operation.

Another object of the invention is to provide a gravity flow moving bed adsorption unit wherein the adsorbent efficiency can be maintained at a higher point than in fixed bed units since make-up can be added conveniently while in operation at intervals to compensate for attrition losses and, if necessary, a small amount of adsorbent can be withdrawn to allow an even greater make-up rate of fresh adsorbent. It should be noted that in some instances the efficiency of a fixed bed adsorber gradually decreases over a period of several months until it becomes uneconomical to operate the unit, at which time the adsorbent beds must be replaced.

Another object of the invention is to provide a gravity flow moving bed adsorber unit which offers greater flexibility for control of adsorbent and regeneration gas circulation rate than others known in the art.

Another object of the invention is to provide a gravity flow moving bed adsorption unit with a simplified control system without any requirement of a time cycle device.

Another object of the invention is to provide a gravity flow moving bed adsorption unit wherein the continuously recovered products therefrom will be of relatively constant quality and quantity, which factor operates to make further processing less expensive. In contrast, fixed bed units produce products of continually varying quantity and composition.

Another object of the invention is to provide gravity flow moving bed adsorption unit wherein the recycle of adsorbent from the adsorber section to the regeneration section may be accomplished either internally or externally of the adsorption tower or vessel.

Another object of the invention is to provide gravity flow moving bed adsorption unit wherein a recycle of particulate adsorbent from the lower portion of an adsorbing zone to the upper portion of a regeneration zone is achieved by the use of a gas stream which may or may not be of the same composition as the gas entering the adsorption zone or the gas entering the regeneration zone, and wherein the gas streams run into the adsorption zone or used for regeneration are also employed to recycle the adsorbent material in the manner described.

Another object of the invention is to provide a gravity flow continuous, moving bed adsorption unit wherein the adsorbent material is continuously moved downwardly, as a unitary bed, in the containing vessel or vessels therefor, with continuous counterflow recycle to the top of the bed of the adsorbent material from the lowermost portion thereof.

Another object of the invention is to provide a gravity flow continuously moving bed adsorption unit therefor employing either dilute phase or combined dense-dilute phase counterflow transport of the recycled adsorbent therein.

Another object of the invention is to provide a gravity flow moving bed adsorption unit wherein the bed of adsorbent material moves downwardly through the vessel or vessel portions containing same, the adsorbent material counterflow recycled through either a dilute phase or a combined dense-dilute phase gas driven riser flow channel again to the top of said bed, the pressure drop across the riser channel always greater than the total pressure drop through the downwardly moving bed or portion thereof, thus permitting the use of higher pressure adjacent the gravity flow terminus of the vessel or unit.

Another object of the invention is to provide a gravity flow operated moving bed adsorption unit utilizing a downwardly moving bed or beds of adsorbent material, the adsorbent material counterflow recycled by gas flow upwardly from the gravity flow terminus of said bed to the beginning thereof and wherein any leakage of lift gas up into the lower adsorber bed will also cause a gas leakage from the upper adsorber bed into the lower regeneration bed.

Another object of the invention is to provide upward gas flow recycle adsorbent material lift means in the form of a dilute flow phase or combination dilute and dense flow phase riser channel in a gravity flow adsorbent bed process, whereby the amount of adsorbent being upwardly recycled may be regulated by the increase or decrease of the amount of recycle lift gas entering the riser channel.

Another object of the invention is to provide a gravity flow moving bed adsorption unit employing a downwardly moving bed of adsorbent material wherein gas counterflow upward adsorbent material recycle and lift means are provided in which the pressure drop across the said gas recycle lift means can be varied to reduce or actually prevent leakage of desorbing or adsorbing gases either into or out of regeneration and lift gas systems in the process.

Another object of the invention is to provide a gravity flow moving bed adsorption unit wherein regeneration gas may be cooled by spent adsorbent to a considerably lower temperature than achievable heretofore, and, additionally, the quantity of regeneration gas can also be substantially reduced.

Other and further objects of the invention will appear in the course of the following description thereof.

*Drawings*

In the drawings, which form a part of the instant specification and are to be read in conjunction therewith, embodiments of the invention are shown and, in the various views, like numerals are employed to indicate like parts.

FIG. 1 is a schematic cross-sectional view of a first form of gravity flow moving bed adsorption vessel or tower in which the inventive adsorption processes may be carried out and wherein upward gas drive recycle of adsorbent material from a lower portion of an adsorption zone to an upper portion of a regeneration zone is carried out entirely within the vessel.

FIG. 2 is a schematic diagram of the application of the gravity flow moving be adsorption apparatus and process of FIG. 1 in the adsorption of water and hydrocarbon components from a natural gas stream.

FIG. 3 is a schematic cross-sectional view of a first modified form of gravity flow moving bed adsorption tower or vessel in which the inventive adsorption processes may be carried out and wherein particulate adsorbent material is counterflow recycled by gas flow means from a lower portion of an adsorption zone in the vessel to an upper portion of a regeneration zone therein entirely externally of the adsorption tower or vessel.

FIG. 4 includes in the center and to the right in the view, a schematic flow diagram illustrating a second modified form of gravity flow moving bed adsorption unit, vessel and process applied in adsorption of water and hydrocrabon components from a natural gas stream, the said second modified form of gravity flow moving bed adsorption tower or vessel shown in schematic cross-sectional view to the left in the view, gas flow recycle of adsorbent material from a lower portion of an adsorption zone in the unit to an upper portion of a regeneration zone therein shown as accomplished entirely within the vessel, analogous to the case in FIG. 1.

FIG. 5 shows a portion of a modified form of riser pipe in section.

*FIG. 1 vesssel or tower (structure and operation)*

Referring first to FIG. 1, therein is shown a preferably but not necessarily both vertically oriented and unitary gravity flow moving bed adsorption tower 10 having a cylindrical vertical side wall with upper end 11 and lower end 12. A first baffle, partition or plate 13 is here horizontally positioned intermediate the ends of the vessel and interiorly thereof having perforations or openings therethrough. In the illustrated instance, the openings have hollow cylindrical nozzles, conduits or legs 14 on the underside of plate 13 surrounding same. A secondary baffle, partition or plate 15 is also here positioned in horizontal juxtaposition adjacent the upper end of the vessel with perforations or openings therethrough. Tubes, legs or nozzles 16 may preferably be provided surrounding same on the underside of the plate. A third baffle or plate 17, comprising a conical collecting means with a cylindrical flange 18 at the lower end thereof is here preferably positioned adjacent the lower end 12 of the vessel. Tube 18 discharges into a larger diameter upwardly extending passageway formed by a perforated cylindrical flange 19 in a fourth and lowermost partition or baffle 20.

The above-listed partitions, baffles or plates divide the illustrated unitary vertical adsorption vessel into zones as follows: First, an upper rich adsorption material recycle collection zone 21 (above plate 15), second, an adsorbent material regeneration (regenerating gas adsorption) zone 22 (between plates 13 and 15), third, an adsorbent material adsorption (adsorption gas desorption) zone 23 (between plates 13 and 17), fourth, an upper pressurization zone 24 (between plates 17 and 20) and fifth, a lower pressurization zone 25 below plate 20.

A gas counterflow recycle conduit 26 is here provided passing centrally upwardly through and supported by plates 13 and 15. Pipe or conduit 26 communicates from levels between the upper and lower end of flange 18 in plate 17 and within zone 21 above partition 15. An inverted dish-shaped baffle 26a is positioned fairly closely above the upper end of pipe 26.

A first gas input line 27 serves and feeds any suitable distributing device 28 in the lower portion of the gas desorbing or adsorbent adsorption zone 23. Device 28 has outlet openings therein and extends circumferentially of pipe 26 to feed adsorption gas to be desorbed uniformly therearound. Withdrawal line 29 operates to take effluent non-adsorbed gas from the upper portion of adsorption zone 23. A second input gas flow line 30 above plate 13 feeds lean regenerating gas into second gas distributing device 31 of the same character as device 28, while a second rich regeneration gas withdrawal line 32 withdraws rich or fat regeneration gas from the upper portion of regeneration zone 22.

Main gas feed line 33 (lower left-hand corner of FIG. 1) passes gas from any suitable source into branching lines 27, 38 and 39, each of said lines being provided with a flow regulating valve or device of conventional sort, 34, 35 and 36, respectively. Line 38, which enters zone 25 centrally of the bottom of the vessel lower end 12 opposite and below the lower end of pipe 26 provides primary countercurrent adsorbent material recycle gas flow. Line 39 passes additional flow gas into zone 24 circumferentially of flange 18 and within flange 19 whereby to complete the recycle feed drive means.

While a unitary vertical vessel with vertical deployment of zones 22 and 23 and vertical counterflow recycle of adsorbent in channel 26 is shown, it should be understood that downward gravity flow of adsorbent in the zones and upward counterflow gas drive recycle are the critical features, not unitary tower construction, adjacent zones or zone verticalities. Gravity flow between zones is optimum, not critical, nor is positioning of the zone 22 above 23.

In a brief description of the generalized operation of the gravity flow moving bed absorption tower construction of FIG. 1, rich feed or adsorption gas 33 passes into lines 27, 38 and 39 relative quantities therein regulated by flow control devices 34, 35 and 36. The zones 22 and 23 are each packed or loaded with suitable particulate adsorbent such as silica gel, zeolite, or other suitable adsorbent particulate substance, the total quantity in the two zones extending at least substantially between plates 15 and 17. These bodies of material move downwardly motivated solely in the respective zones by gravity. The upper particles ultimately pass (here by gravity) through openings 14 in plate 13 and thence through zone 23 ultimately into funnel flange 18 of plate 17. The feed gas flowing through line 27 passes into distributing device 28. Simultaneously, lean regeneration gas from an entirely separate second source is flowed through line 30 into lower zone 22. Upper take-off of the lean process or denuded feed gas from upper zone 23 through line 29 and same of rich regeneration gas from upper zone 22 through line 32 are accomplished. The combined regulated flows of rich process gas through counterflow recycle lines 38 and 39, operate to collect and force the adsorbed adsorbent particulate material which spills through funnel flange 18 into and up pipe 26 to be then discharged into zone 21 and fall onto plate 15. From thence the said loaded particles pass through openings 16 by gravity to complete the recycle counterflow. The volume of gas flow through lines 38 and 39 must, of course, be sufficient to collect the adsorbent material particles and move them up pipe 26. The passage of the input lift gas from lines 38 and 39 up pipe 26 is taken in preference to the alternative flow possibility into zone 23 through flange 18 due to the restriction to gas flow created by the adsorbent packing into the necking down funnel flange 17. By maintaining the pressure of lean input regeneration gas in regeneration zone 22, lower portion, substantially the same as that at the top of adsorption zone 23, passage of gas therebetween (and particularly of denuded feed gas) is preferably substantially minimized. Likewise, substantial equality of pressure between zone 21 and top of zone 22 minimizes flow of gas therebetween. Rich feed gas entering zone 21 from lift pipe 26 leaves the adsorption vessel through line 37 and may be reintroduced into one of the process streams if desired, as will be described.

*FIG. 3, vessel or tower (structure and operation),*

Turning to FIG. 3, which shows an external gas drive counterflow recycle in a gravity flow moving bed adsorption tower or system, the illustrated cylindrical side wall of tower vessel 50 has upper and lower ends 51 and 52. A first preferably substantially centrally located horizontal baffle 53 is provided having openings 54 therethrough preferably with concentric vertical flanges or tubes fixed therearound on the underside of plate 53. Lower end 52 of vessel 50 is suitably and preferably conical shaped to choke feed by gravity rich adsorbent particles uniformly into dicharge pipe 55. Pipe 55 leads by suitable gravity flow curve into vertically oriented gas flow recycle tank 56 having a conical choke feed baffle 57 adjacent the lower end thereof. Baffle 57 divides vessel 56 into upper feed zone 58 and lower recycle zone 59. Conical baffle 57 discharges by gravity into a preferably larger internal diameter concentrically positioned, upwardly extending passageway formed by a cylindrical flange 59a received in a partition or baffle concentric thereto.

Counterflow gas drive recycle channel 60 passes from the lower inside end of tank 56 between baffles 57 and 59a upwardly (here vertically) into the lower portion of a second recycle vessel or tank 61 having disengaging baffle 62 inside thereof operative to deflect adsorbent particles toward preferably gravity flow rich particle return pipe 63. The latter enters the upper end of the vessel 50 as at 63a. Pipe 78 above disengaging plate 62 leads rich feed gas recycle as to be described. Plate or partition 53 operates to divide vessel 50 into an upper regeneration zone 64 and a lower adsorption zone 65.

Primary gas feed line 66 from a first source of rich adsorption gas to be adsorbed (lower left side of FIG. 3) splits into lines 67 and 68, the latter then dividing into lines 69 and 70. Lines 67, 69 and 70 are each provided with a flow regulating device 71, 72 and 73, respectively.

Adsorption zone rich gas feed line 67 passes into the lower end of adsorption section 65 above choke 52 and has gas distribution device 67a thereon. First lean adsorption gas withdrawal line 74 leads from the upper end of adsorption section 65 immediately below partition 53. Second lean regeneration gas input line 75 enters the lower end of regeneration zone 64 and carries second gas distribution device 76. Withdrawal of rich regeneration gas is accomplished from the upper end of regeneration zone 64 by gas line 77. Rich adsorption gas flowline 70 (which enters the lower end of tank 56 immediately opposite the lower end of pipe 60) provides the main quantity of counterflow recycle gas flow. Like line 69 which passes into tank 56 above the lower end of pipe 60 and through the lower end of cone partition 57 in vessel 56 provides the secondary choke feed quantity of counterflow recycle gas flow. Comments are made and here incorporated as with respect to structure of vessel 50 and its parts like were applied to vessel 10 and its parts.

In operation of the external recycle adsorption vessel shown in FIG. 3, again, it is assumed that the vessel zones 64 and 65 are each substantially full of bodies of suitable adsorbent material particles. Thus, these bodies extend essentially from adjacent the top of regeneration zone 64 to plate 53 in one gravity flow zone and from plate 53 down through the bottom of adsorption section 65. Additionally, the same choke fills cone 52 and pipe 55 and partially fills, at least, vessel 56 in zone 58 above choke cone 57. As shown, flows between zones 64, 65 and 58, as well as therein, are preferably gravity. With this the case, once operation starts, flow of rich feed gas is begun through main feed line 66 which is split through lines 67, 69 and 70. That rich feed gas passing through lines 69 and 70 operates to both collect the adsorbent particles and force them up pipe 60 in counterflow recycle into tank 61. From tank 61 they pass preferably by gravity feed through pipe 63 into the upper portion of regeneration zone 64. Thus, in the vessel illustrated, there is a continuous gravity drive streaming flow of the adsorbent particle material downwardly through the main vessel 50 and a counterflow gas drive thereof upwardly through pipe 60. The volume of gas flowed into lines 69 and 70 must be sufficient to effect the desired quantity of adsorbent recycle. Rich feed gas from the top of tank 61 leaves through line 78 and may be reintroduced into one of the process streams if desired as to be described. The rich feed gas from line 67 is passed through the lean or regenerated or originally present adsorbent materials and, stripped or lean gas is removed through line 74. A sufficient quantity of a suitable lean regenerating gas is passed through line 75 into distributing device 76 and zone 64 and then recovered, rich or loaded, through upper line 77.

FIG. 2 process (re FIG. 1 tower)

Referring now to FIG. 2, therein is shown a typical application of the adsorption process and particular tower or vessel of FIG. 1 in adsorption of water and hydrocarbon components from or desorption thereof from a natural gas stream. Apparatus parts or elements common to FIG. 1 are given identical numbers as therein. (It should be noted that the FIG. 3 system can substitute in the FIG. 2 system if lines 77, 75 and 79 thereof act as the termini for the lines 32, 30 and 30b of FIG. 2, respectively.)

Additional parts are as follows: In the first place, regeneration gas discharge line 32 leads through optional heat exchanger 80 and regeneration gas cooler 81 to a vessel or accumulator 82 wherein the loaded rich regeneration gas is separated from the original adsorbed stripped material therein. From vessel 82 discharge line 83, controlled by level control value 84, passes the stripped product to further processing or storage. Recycle line 85 passes from vessel 82 to regeneration gas compressor 86, thence through heat exchange with the gas from line 32 in exchanger 80, then through regeneration gas heater 87 and finally by line 30 to the lower end of the regeneration section 22. Line 30b with valve 30c splits from line 30 before valve 30a thereon to join the line preceding lines 38 and 39 after valve 27a thereon. Lines 37 from zone 21 splits into two alternative flowlines, one 37a with valve 37b thereon and the other 37c with valve 37d joining line 85 before compressor 86.

Certain features of the instant process may be noted as practiced in the described apparatus:

(1) The particulate solid adsorbent material moves down the main column sections as a plug or in slightly expanded state. This particulate solid material is returned to the top of the regeneration section from the bottom of the adsorption section by means of a recycle gas flow channel which may be either internal or external to the column.

(2) The particulate solid adsorbent material, after passing through the adsorption zone adsorbing process, is lifted up the recycle flow channel by gas flow force.

(3) Regeneration or desorption of the rich or loaded particulate solid adsorbent is accomplished in the upper portion of the column by heating and/or stripping same with a hot gaseous stream in a closed cycle.

(4) The adsorbed material, which is removed from the rich solid particulate adsorbent by the lean hot regeneration gas, is continuously recovered or otherwise removed from the rich regeneration gas.

(5) Cooling zones may be provided in any desired or necessary points in the column or the column sections. Such zones may be cooled with any suitable material which is circulated in pipes (indirect heat exchange) inside the vessel. Cooling is most easily performed by direct contact with the adsorption or regeneration gas streams in the column sections.

FIG. 4 vessel or tower and process

Referring first to the gravity flow movable bed adsorption vessel or tower shown to the left in FIG. 4, and particularly to the particular illustrated structure thereof, the optimally vertical unitary tower has a cylindrical vertical side wall 100 with upper end 101 and reduced diameter lower end 102. A first baffle or partition plate 103 is positioned intermediate the upper and lower ends of the vessel and interior thereof. Partition plate 103 has openings 104 therein, preferably with depending hollow nozzles or legs 104a on the underside thereof, fixed circumferential to said openings 104. The reduced diameter lowermost end 102 of vessel 100 is preferably cylindrical in form as seen and is connected to the greater diameter cylindrical side wall 100 thereof by a conical choke feed portion 105. A cylindrical closure member 106 is joined to the outside surface of the conical portion 105 as at 107 and has rounded lower end 108 thereof. A second partition plate 109 having normally closed drain opening 110 therein is fixed across the upper portion of the rounded lower end closure 108 which itself has normally closed drain opening 111 therein preferably below opening 110 in plate 109.

A lift nozzle 112 having a perforated tapered upper end 113 is disposed in openings in closure 108 and plate 109 whereby to preferably extend vertically upwardly within the vertical vessel illustrated. A lift pipe or recycle flow channel generally designated 114 has a lower inverted conical or flared out gathering portion 114a positioned over nozzle end 113, a lesser, yet uniform diameter portion 114b thereof extending immediately thereabove. A second inverted cone flared out portion 114c is connected to portion 114b above the latter and an uppermost uniform diameter open ended portion 114d extends thereabove. Lift pipe 114 passes through plate 103 by means of an opening 115 therethrough and is supported by any suitable means relative thereto (not shown). A disengaging plate 116 of suitable shape is preferably provided and supported by any suitable conventional means (not shown) adjacent to an outlet nozzle 118 in the uppermost part of vessel 100.

A main rich feed gas inlet nozzle 119 penetrates an opening 120 in the side wall of the tower and may have a distributor ring or other conventional gas dispersing means 121 interior of the tower connected thereto. A main lean gas outlet nozzle 122 communicates with opening 123 in the tower slightly below partition plate 103. A lean regeneration gas inlet nozzle 124 passes through opening 125 in the tower wall and again may have conventional gas distribution means such as a distributor ring 126 connected thereto internally of the vessel above plate 103. Steam or other medium may be added via line 125a with valve 125b.

It is noted as indicated on the drawing that partition plate 103 divides the vessel into a lower rich feed gas adsorption zone generally designated 127 and an upper rich adsorbent material regeneration zone generally designated 128.

A gas flow inlet nozzle 129 for lift gas flow communicates through opening 130 in the side wall of closure member 106 and passes gas downwardly around the lower edge of reduced diameter portion 102 comprising the lower end of the tower structure proper.

*FIG. 4 flow diagram and process*

Turning to the process and flow diagram of FIG. 4, a first rich feed gas flow 132 divides into feed line 132a having valve 132b thereon communicating with inlet nozzle 120 and bypass line 132d with valve 132c thereon joining line 135 to be described. Lean or denuded gas outlet flowline 133 removes same from gas outlet nozzle 122. The enriched regeneration gas and rich feed or other lift gas both are removed through top nozzle 118 communicating with upper outlet line 135.

Line 135 passes through (optional) regeneration gas heat exchanger 137, thence through regeneration gas cooler 138 and from there to product receiver vessel 139. Water separation vessel 140, connected to the lower portion of product receiver vessel 139 has lever control 141 thereon connected to valve 142 on discharge line 143 therefrom. Hydrocarbon product discharge line 144 has valve 145 thereon connected to lever control 146.

Regeneration gas recycle line 147 has gas compressor 148 thereon and passes therefrom through gas exchanger 137 and thence to regeneration gas heater 149 to regeneration gas inlet nozzle 124. Flow regulating device 150 is provided between heater 149 and lift gas take-off line 151 after exchanger 137 on line 147.

Lift gas take-off line 151 from line 147 has input flowline 151a with valve 151b thereon communicating with a third gas source or the second source and splits into secondary lift gas line 152 and primary lift gas line 153 provided with flow control devices 156 and 157, respectively. Lines 152 and 153 lead to secondary lift gas inlet nozzle 129 and primary lift gas inlet nozzle 112, respectively.

Gas entering nozzle 119 is the main process gas (rich adsorption gas) containing components which are to be adsorbed, the then denuded gas leaving the adsorption zone below plate 103 by way of nozzle 122. Additional quantities of bypass rich feed gas may be flowed through bypass line 132d and valve 132c thereover to join recycle line 135 before regeneration gas cooler 138 and maintain a constant volume in the regeneration gas system. Lean regeneration gas enters the vessel through nozzle 124 and leaves in enriched form via nozzle 118. Lift gas (lean recycle regeneration gas) enters vessel through nozzles 129 and 112, leaving the vessel via nozzle 118 with the regeneration gas. Additive quantities of lift gas from any suitable third source or the second source may be added at line 151a.

The lower section of the adsorber incorporating nozzles 129 and 112 (as in the case of the illustrated towers of FIGS. 1 and 3) comprises a device familiar to those skilled in the art whereby the rich adsorbent particulate material is picked up out of the bed into the lift channel pipe 114 pneumatically lifted in a dilute and/or dense gas flow phase. The relative heights of the dilute and dense flow phases are provided in the specific flow channel structure employed such that the overall adsorber pressure balance can be maintained. In some instances a dense phase portion will not be required in the lift pipe.

The regeneration section or zone 128 comprises a vessel section having a bed of particulate adsorbent moving downwardly therein under gravity flow with hot lean regeneration gas flowing upwardly therein countercurrent to the said bed. The lean regenerated particulate adsorbent material is passed preferably by gravity flow into the upper portion of adsorption zone 127 (here falls through openings 104 in plate 103 into the therebelow adsorption zone 127) and therein continues to move downwardly by gravity flow through choke zone 105 to the inlet end of lift pipe 114. The main rich feed gas stream entering nozzle 119 flows upwardly countercurrent to the downward gravity flow of adsorbent in zone 127.

While, generally speaking, any number of devices could be used to pick up the rich, adsorbed particulate adsorbent material from the bottom of the adsorption zone and transport it counterflow to the upper end of the regeneration section 128, one of the unique features of the FIG. 4 modification comprises the preferred utilization for this task of a combination dilute and dense flow phase recycle gas flow lift pipe. This arrangement enables the regulation of the amount of rich particulate adsorbent flowing through the sections 127 and 128 by increase or decrease of the amount of secondary lift flow gas entering the adsorber via nozzle 129. The balance of the recycle lift flow gas required to transport this material enters the lift flow feed means through nozzle 112. The dilute flow phase portion of the lift pipe (114b) has a lesser pressure drop per unit of length than the dense flow phase portions (114c and 114d) and, therefore, by precalculating the relative required amounts of dense flow phase and dilute flow phase riser heights (relative to the required total rise distance between the pipe ends), the adsorber vessel may be designed with a given pressure drop across the lift channel or pipe 114. With this known pressure drop and by means of the controlled heights of legs 104 and choke section 105, any leakage of rich feed gas or lean feed gas from zone 127, the latter into closed regeneration zone or system 128, the former into the lift gas system below choke section 105 can be reduced or actually prevented. The reverse is also true, but less important.

It is necessary to incorporate sufficient particulate adsorbent choke feed height between the lift pipe pickup device (within cylinder 102) and the main gas inlet nozzle 119 to substantially reduce or eliminate any objectionable amount of lean lift gas which may tend to leak vertically upwardly from the recycle gas flow lift pipe inlet below or at the adsorption zone lower end.

Remarks previously made with respect to critical geometrical, structural, and gravity flow features of the regeneration and adsorption zones of the systems of FIGS. 1 and 3 are repeated and incorporated verbatim here.

Referring to the overall process, the main rich feed gas stream entering nozzle 119 contacts the gravity flow moving adsorbent bed in the adsorption section in countercurrent fashion during which period desired components carried by the said rich main gas stream are adsorbed on the parcticulate material, the other materials in the then lean main gas stream continuing countercurrent up the section where they operate to and are used to cool by direct contact the freshly regenerated particulate adsorbent as it enters the adsorbing zone 127 from regeneration zone 128 (preferably by gravity flow). The lean main gas stream then leaves the upper portion of adsorber section 127 via nozzle 122. The enriched adsorbent particulate material itself then leaves the adsorbing zone 127, (again preferably by gravity feed) passing downwardly here shown to then be recycle gas flow transported up lift pipe 114 to the top of regeneration zone 128.

The lean regeneration gas in line 147 is heated in regeneration gas heater 149, and enters the regeneration section lower portion via nozzle 124. This lean hot gas flows in counter-flow movement to the regeneration section adsorbent flow upwardly through the regeneration section 128 simultaneously heating and stripping from the gravity flowing adsorbent. The lean lift gas coming out of the upper end of pipe 114 and the rich regeneration gas containing the desorbed material both leave the regeneration section upper end via nozzle 118 thence passing into regeneration gas heat exchanger 137. The latter partially cools the said mingled gases by contact with cold lean regeneration gas and from thence the said mingled gases pass through cooler 138 into condenser 139.

The desorbed components carried therein are condensed from the vapor to a liquid phase in receiver 139. This condensed material is then separated from the said mingled regeneration and lift gases with water taken off through line 143 and hydrocarbon product through line 144. These materials are dumped to storage or further processing. The mixed lean lift and regeneration gas then leave accumulator or receiver 139, pass through compressor 148 and from thence back into (optional) regeneration gas exchanger 138 where some heat is picked up. From there the cycle is as previously described.

Further commenting on the function and features of the FIG. 4 modification, it is necessary in commercial application to achieve an over-all systemic pressure balance which controls or prevents leakage of gas from one section of the system to the other. The combination dilute flow phase-dense flow phase flow channel is incorporated in those cases where it may be required to facilitate achieving such over-all systemic pressure balance. In some instances, a single dilute flow phase riser pipe can be employed without a requiring dense phase portion. The FIG. 4 flow diagram shows a combination regeneration and lift gas compressor which completely closes and isolates the entire external gas flow system. Any leakage of rich feed gas or lean regeneration gas occurring between the main gas inlet 119 and the lift gas inlet 112 will also tend to cause a compensating lean regeneration or lean feed gas leakage across the divider plate 103 or separating means between the regeneration and adsorber sections. In practice, it is desirable to cause any such leakage between the main gas inlet 119 and the lift gas inlet 112 to be in an upward direction; that is, to leak lean lift gas into the adsorption section rather than rich main feed gas into the lean lift gas system. This is to insure that any leakage across the divider plate 103 or means from the adsorption section zone to the renegeration system will also be in the upward direction, (lean feed into lean regeneration) thereby reducing the possibility of leaking rich regeneration gas directly into the lean main gas outlet stream 122. It is also important to note that limited leakage of lean lift gas into the adsorption lower section will not be detrimental since this leaked lean lift gas will, of necessity, have to pass through the adsorption zone.

A separate lift pot beneath the main adsorber vessel and connected thereto with suitable (preferably gravity flow) conduits for the adsorbent may be employed without departing from the spirit of this invention.

As seen in FIGS. 1 and 3, it is feasible to separate the outputs of the recycle lift flow gas and the regeneration gas systems. This may be done by installing a divider plate immediately above the regeneration zone and a separate section gas outlet nozzle.

In a specific example, a feed stream in line 132 consists of natural gas containing water and LPG and natural gasoline components and be recovered at 1000 p.s.i.g. and 100° F. at a rate 15 million standard cubic feet per day.

The gas exists through line 122, denuded gas output, at approximately 120° F. (note temperature here higher than input due to direct contact cooling of the regenerated adsorbent by the denuded gas), 998 p.s.i.g. and at a rate of 14,907,000 standard cubic feet. Approximately 4200 pounds per hour of adsorbent solids circulation is employed. Gases used for regeneration of the adsorbent and for transporting the adsorbent up the riser pipe enter the adsorption vessel through lines 147, 152 and 153, respectively. Approximately 1 million standard cubic feet per day of gas is employed to regenerate the adsorbent and approximately 1.3 million standard cubic feet per day of gas is employed in lines 152 and 153.

Looking at FIG. 2, it should be noted that the recycle lift gas flow can be operated in any one of many ways. In the first place, the sole source of gas flow into lines 38 and 39 may be provided from the main gas in line 33 by virtue of shutting valves 30c and 30e in lines 30b and 30d, respectively, and opening valves 34, 35, 36 and 27a. A second method of operation involves using only gas from an outside or third source in line 30d by shutting valves 27a and 30c in line 30b while leaving valves 30e, 34, 35 and 36 open. A third mode of operation (preferred) is to use only gas from the regeneration system in line 30b by opening valves 30c, 34, 35 and 36 and closing valve 27a. A fourth method can use a mixture of main gas from line 33 and regeneration gas from line 30b by opening valve 30c in line 30b, valve 27a and valves 34, 35 and 36 and closing valve 30e in line 30d. A fifth method can use a mixture of main gas (in line 33) and gas from an outside or third source from line 30d by opening valves 27a in line 35 and 30e in line 30d, valves 34, 35 and 36 and closing valve 30c in line 30b. A sixth method can use a mixture of regeneration gas from line 30b and as from an outside or third source from line 30d by opening valves 30c in line 30b and 30e in line 30d and closing valve 27a. Valves 34, 35 and 36 would be open.

As previously noted, it should be carefully observed that the tower construction of FIG. 3 may be substituted for that of FIG. 1 in the hookup of FIG. 2 by substituting the end connection of line 30b in FIG. 2 into line 79 in FIG. 3, the end connection of line 30 in FIG. 2 to line 75 in FIG. 3 and the end connection of line 32 of FIG. 2 into line 77 of FIG. 3. The recycle flow gas line 78 off the top of container 61 in FIG. 3 will then divide in the same manner as line 37 in FIG. 2 with one valve controlled line (not shown) joining the regeneration gas cycle line before the regeneration gas compressor 86 as in the manner of line 37c in FIG. 2, the other alternative valve controlled line, analogous to line 37a in FIG. 2, going out of the system. As in the case of FIG. 2 and FIG. 1, FIG. 3 may employ an alternative lift gas line 79d having a valve 79e thereon joining line 70 before valve 73 thereon and after the junction between lines 69 and 70. A valve 71a analogous to valve 27a in FIG. 2 may also be provided for the various control purposes immediately previously described.

On the other hand, referring to FIG. 4, while lift gas from an additional source may be input through line 151a controlled by valve 151b to aid the main recycle gas stream in line 151 operating as lift gas in the primary and secondary lines 152 and 153, this line is ordinarily best employed as a make-up gas line to maintain constant volume in the closed cycle regeneration system. The essence of the system of FIG. 4 is to provide a lift gas system which may be set into operation whereby the circulation of adsorbent material may be begun before the main input gas stream into the adsorption zone is begun. It should be noted that, in the process of FIG. 4, the entire quantity of lift gas plus the entire quantity of regeneration gas is taken off through line 135, joined by any bypass main gas through line 132d and thence recycled in circulation split between the regeneration system and the lift gas system.

On the other hand, in FIGS. 1 and 3, the regeneration system in the upper regeneration zone is itself essentially a closed cycle (in FIG. 3 the baffle 62 operates substantially in the manner of the baffle 15 of FIG. 1) whereby the over-pass of the lift gas into its separate zone becomes essentailly an artifact. Only by the recycle into the other portion of the regeneration system, as seen, for example, in line 37c of FIG. 2, together with careful valve regulation and control at 30a, is it possible to approximate the results of the FIG. 4 system. The separation of the two portions of the regeneration system in FIGS. 1 and 3 causes loss of efficiency and does not make a satisfactory equivalent to the simpler, more direct FIG. 4 system, thus making lift by at least a portion of the rich feed gas much preferable in these modifications.

In all cases, the base pressure from which all other pressure parameters are measured, computed and adjusted, comprise the input pressure to the lower adsorption zone through distributors 28, 67a and 121 of FIGS. 1, 3 and 4, respectively.

As other examples of specific systems, the removing of water from air, the dehydration of any gas stream, solvent recovery in the sense of heavy ends removed from light carriers or vice versa, the separation of nitrogen and oxygen in air and the removal of acetone from an air stream with steam as a regenerating medium are all typical processes in which the various means and methods shown and described herein may be employed.

A typical adsorbent material would comprise a solid, alumino-silicate molecular sieve type adsorbent, such as certain natural or synthetic zeolites such as a calcium alumino-silicate which exhibits the properties of a molecular sieve, that is, matter made up of porous crystals wherein the pores of the crystals are of molecular dimension and are of substantially uniform size. Molecular sieves and methods of making and using them in separation of various hydrocarbon materials, such as normal from branched chain hydrocarbons are fully described in British Patent 777,232, also U.S. Patent 2,442,191, and other U.S. Patents such as Ricards 2,899,474, Patterson 2,901,519, Gilmore 2,921,970, Haensel 2,920,037, Fleck 2,935,467, Feldbauer 2,944,092, which patents are incorporated herein by reference with respect to the disclosure of the nature and generalized use of sieves in separation and processes, per se.

Approximately 0.3 million standard cubic feet of the lift gas pass up through the adsorption bed and the balance of the lift gas goes up the lift pipe with the recycle adsorbent. Due to the passage of some of the lift gas up into the adsorption bed, approximately 0.3 million standard cubic feet of denuded gas will pass up through openings in plate 103 rather than pass out line 133 with the balance of the denuded gas.

The regeneration gas entering in line 147 is at approximately 600° F., having been heated in heater 149, combines with the denuded gas passing through plate 103 and passes vertically upwardly through the regeneration bed where it heats the adsorbent and desorbs the water and hydrocarbon components off the adsorbent so they may be carried out in the vessel as a vapor in line 135 which contains the combined streams of gases leaving the regeneration bed and the gas leaving the top of the riser pipe. These gases in line 135 are at approximately 155° F. Regenerated adsorbent leaves the regeneration zone 128 and passes through openings 104 and pipes 104a in plate 103 at a temperature of approximately 500° F. and thereby enters the adsorption bed where it is first cooled by the denuded gas in the uppermost portion of the adsorption zone 127. It then adsorbs the water and other hydrocarbon components in the lowermost portion of the adsorption zone before passing down to the entrance of riser pipe 114.

The combined regeneration and lift gas streams containing the desorbed materials in line 135 pass to the regeneration gas heat exchanger 137 where they are partially cooled by the gases in line 147. They then pass to the regeneration gas cooler 138 where the desorbed components are condensed and later collected in the product receiver 139. The water is withdrawn in line 143 through valve 142 controlled by controlled 141. The hydrocarbon product is withdrawn in line 144 through valve 145 controlled by controller 146. The remaining regeneration and lift gas from which the desorbed products have been condensed and separated pass through the products receiver 139 to compressor 148 in line 147 where they are compressed slightly so they may be returned to the adsorption vessel for reuse in lines 147, 151, 152 and 153 as previously described. In this example, the product water rate in line 143 is 21 pounds per hour and the hydrocarbon rate in line 144 is approximately 690 pounds per hour.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:
1. A gravity flow moving bed adsorption vessel having a tapered lower end section comprising in combination an elongated vessel having,
   a centrally located partition dividing the vessel into a lower adsorption section and an upper regenerating section,
   restricting passageways through the partition providing communication between said sections,
   a main gas inlet into the lower portion of the adsorption section and a product gas outlet from the upper portion of the adsorption section,
   a gas inlet into the lower portion of the regenerating section for supplying a regenerating gas to said section, a gas outlet in the top of the regenerating section for discharging gas containing adsorbed liquids,
   adsorption particulate material substantially filling the respective sections,
   a lift pipe located within said vessel whose lower end communicates with the lower portion of the adsorption section and whose upper end communicates with the upper portion of the regenerating section,
   a gas lift assembly in the lower end of the lift pipe for supplying lift gas thereto,
   said tapered portion of said vessel forming the lower end of the adsorption section terminating in a depending open end tube of lesser diameter than the vessel,
   an enclosure of greater diameter surrounding said open end tube enjoined with the vessel at its tapered section, and
   lift gas inlets into the bottom and side of said enclosure.

References Cited

UNITED STATES PATENTS

| | | | |
|---|---|---|---|
| 2,616,521 | 11/1952 | Berg | 55—79 |
| 2,638,999 | 5/1953 | Berg | 55—79 |
| 2,921,970 | 1/1960 | Gilmore | 55—79 |

REUBEN FRIEDMAN, *Primary Examiner.*

C. N. HART, *Assistant Examiner.*